Patented Jan. 31, 1928.

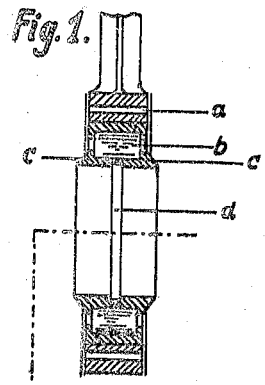
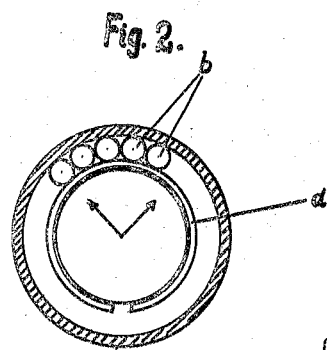
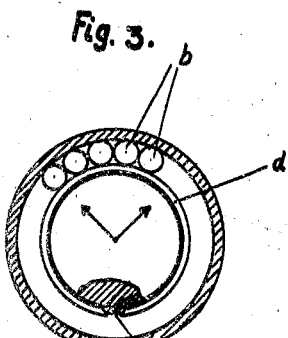
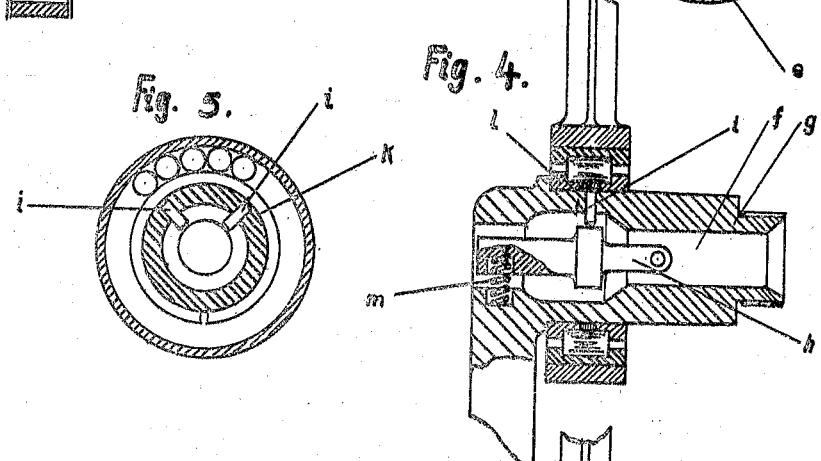
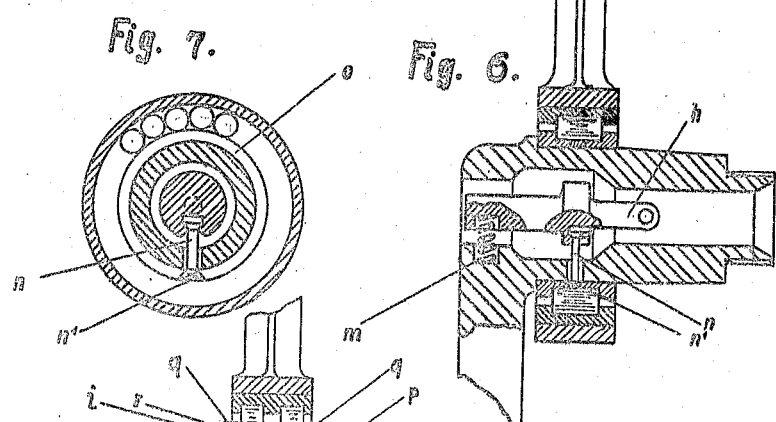
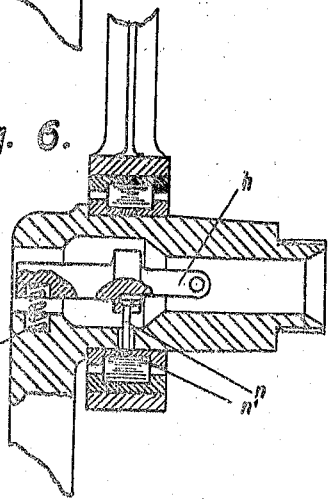
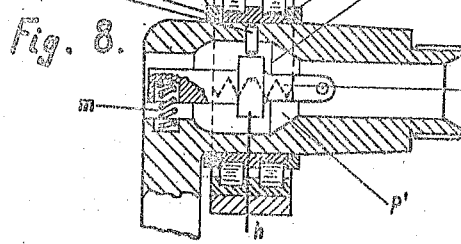

1,657,536

UNITED STATES PATENT OFFICE.

ALBERT HEESS, OF STUTTGART-CANNSTATT, AND OTTO SCHILLING, OF STUTTGART-UNTERTURKHEIM, GERMANY, ASSIGNORS, BY MESNE ASSIGNMENTS, TO DAIMLER-BENZ AKTIENGESELLSCHAFT, OF BERLIN, GERMANY.

ROLLER BEARING.

Application filed March 17, 1924, Serial No. 699,686, and in Germany March 23, 1923.

Practical experience has shown that roller-bearings, which include rolling elements arranged to travel between rigid roller-races, in combination with trunnions and more especially with crank-pins of internal combustion engines, are of maximum efficiency only in such cases, where provision is made to prevent a sliding of the rolling elements relatively to the roller-races and to produce uniform rotary movement of the rolling elements on the roller-race.

For this purpose existing bearings have been provided with resilient auxiliary devices, which by their inherent tensional forces press the rolling elements against the roller race for the purpose of preventing said elements from sliding thereon.

The difference between these well known arrangements and a device constructed according to the present invention consists in the fact that the rolling elements in the latter are prevented from sliding on the race by forces produced by the centrifugal action of the masses of such organs as are constructed and arranged to act upon the rolling elements directly or indirectly. An arrangement embodying the present invention has an advantage over arrangements in which the rolling elements are pressed against the race solely by spring tension, in that the pressure effective upon the rolling elements increases with the increasing number of revolutions of the unit of which the bearing forms a part, so that the rolling elements, being subject also to a correspondingly increasing centrifugal force coincidentally with the aforesaid increasing number of revolutions, are pressed against the roller-race always with the force necessary to prevent sliding of said rolling elements, which force increases as the tendency to slide increases.

The invention may be constructed and arranged in a number of ways. For instance, the inner roller race of the roller bearing may comprise a plurality of rings, one of which, for example, may be arranged so that it will be pressed against the roller elements by the centrifugal force developed in its mass during operative use. This ring may be provided with a tapering slot, with which a key preferably arranged at the crank pin is adapted to engage.

In such case, the ring, under the influence of centrifugal action, is forced upon the key and is thereby spread and pressed against the roller elements.

In another form, the invention may include a pendulum arranged within the pressure ring subject to centrifugal force, in such a manner, that the pendulum will act on the pressure-ring by reason of its inherent centrifugal force and thereby increase the pressing force or effect of the ring.

In the invention, the rolling elements are pressed against the roller race by a pressure of such strength that the frictional resistance developed thereby is greater than the force tending to produce sliding movements in said rolling elements, so that the latter are forced to revolve upon the roller race because of their frictional engagement therewith.

The invention is fully disclosed in the following specification of which the accompanying drawing forms a part, and in which the separate parts of my invention are designated by suitable reference characters in each of the views, and in which five examples of the present invention are represented by eight drawings. A piston rod and crank-shaft of an internal combustion engine have been taken as an illustrative embodiment of the invention.

Fig. 1 is a longitudinal section through the head of a piston rod; Fig. 2 is a detail cross-section of the bearing of the piston rod head shown in Fig. 1; Fig. 3 is a view similar to Fig. 2, showing a form of the invention, however, which differs from the construction according to Fig. 2. The split ring shown in the form illustrated in Figs. 1 and 2 is provided in Fig. 3, with a tapering slot, into which a key engages; Fig. 4 is a sectional view of a further modification, in which the head of the piston rod is super-imposed on a crank-pin. According to this modification a pendulum pressing on studs is arranged within the head of the piston rod; Fig. 5 is a fragmentary section of the modification shown in Fig. 4; Fig. 6 is a further modification in which a sectional view of a crank pin with a super-imposed head of a piston rod is represented. In this modification also a pendulum is located within the boring of the crank pin, said pendulum acting by means of a tension rod on the pressure ring; Fig. 7 is a fragmentary cross-section of the modification shown in Fig. 6; and Fig. 8 is a sectional view of a still further modification showing a piston rod head placed upon the crank pin and a pendulum arranged within the boring of the crank pin, said pendulum acting on the one half of the inner journal-ring.

According to Figs. 1 and 2 a roller bearing $b$ is arranged within the head $a$ of a conventional piston rod. The inner journal-ring consists of the two sections $c$ and $c^1$, between which a ring $d$, which is cut open or split, is located. In this form of the invention, the rollers $b$ are prevented from sliding in the race because the ring $d$, in consequence of the centrifugal force developed therein as the crank-pin rotates, is pressed against the rollers so strongly that the frictional resistance thereby produced is greater than the force tending to make the rollers slide in the race. Preferably, the ring is inserted in such a manner, that the plane in which the axis of the pin and of the crank shaft is positioned, passes through the slot.

In the example shown in Fig. 3, which in general corresponds to the form shown in Figs. 1 and 2, the ring $d$ is slotted or split in a tapering form, and a key $e$ projecting from the crank-pin extends into the slot. In consequence of the centrifugal effect developed as the crank-pin rotates, the ring $d$ is forced onto the key $e$ and the ring is thereby distended and pressed against the rolling elements. That is to say, the ring $d$, which is somewhat larger in interior diameter than the diameter of the pin or other element on which it is mounted is bodily shifted transversely to said pin or the like so as to assume a position eccentric thereto. This shift of position on the part of the ring $d$ causes its end surfaces, which are bevelled, to ride up on the key $e$, which is of wedge-shape as shown in Fig. 3; in this way, the ring $d$ is spread and thereby caused to exert the aforesaid pressure against the rolling elements. It will be understood that the ring $d$ is constructed and arranged so that the centrifugal force developed in the operation of the mechanism of which the ring forms a part, will not cause the ring to expand away from the key $e$; any slight expansion of the ring $d$ due, under such conditions, to centrifugal force, which may take place will simply augment the action of the key $e$. Preferably, the key is arranged so that it will lie in the plane containing the axis of the crank pin and the axis of the crank shaft between the axis of the pin and the axis of the shaft.

In the example shown in Fig. 4, a pendulum $h$ is arranged within the bore $f$ of the crank pin $g$. Abutting against the pendulum are pins $i$, which are pressed by the centrifugal force developed in the pendulum against the distending ring $k$ (Fig. 5) which in its turn presses the roller-elements against the roller race, so that these elements will rotate about their axes in the race in a proper manner.

The efficiency of the pendulum can be improved by providing an increased lever action therein, that is by so locating the pressing-pins $i$ that they engage the pendulum between the center of gravity and the rotary center or fulcrum. In addition to this, the effect of the pendulum may be still further increased by the action of a spring $m$.

The example illustrated in Figs. 6 and 7 differs from the example shown in Figs. 4 and 5 in that a tension rod $n$ is combined with the pendulum $h$, which tension rod is connected with a suitably slotted ring $o$ by means of a tapering or dove-tailed key or end-section $n^1$. With this arrangement, as centrifugal force causes the pendulum to swing outwardly, the tapering end section $n^1$ of the tension rod is drawn into the slot of the ring $o$, whereby the latter is expanded and pressed against the roller elements, so that the latter will revolve properly on the race. In this construction a spring $m$ may be also provided to increase the effect of the pendulum.

According to the example illustrated in Fig. 8, the inner race-ring of the roller bearing is divided into two journal halves $p$ and $p^1$, which fit together along a dividing line $p^2$ of zig-zag shape; it will be understood that the aforesaid dividing line may, however, be of any other suitable shape. Overlapping rings $g$ extend around the journal halves $p$ and $p^1$ and overlap the same, as shown, the journal half $p$ having been inserted into these rings with a play $r$, so that said journal-half $p$ may be displaced or shifted by itself in order to be pressed against the rollers. In addition, the pendulum $h$ in this case exerts its effect upon the journal-half $p$ by means of the pins $i$, when the mechanism is in operation.

The dividing line $p^2$ is preferably arranged in a plane vertical to the plane in which the axis of the pin and that of the crankshaft are disposed.

The invention can be applied not only to crank pin journals, but also to all devices in which forces are created which cause or tend to cause a sliding of the roller elements of the bearings in contradistinction to the intended rolling thereof.

All the forms of the invention include members which, under the influence of centrifugal force, develop a pressure against the roller elements whereby the latter in turn are pressed against the outer member of the raceway, the developed pressure being sufficient to overcome any tendency of the roller elements, at all speeds of rotation, to slide in the raceway.

Having thus particularly described the nature of my invention, what I claim as new and desire to secure by Letters Patent of the United States is:

1. In a roller bearing, the combination of a raceway, roller elements movable therein, the inner race consisting of a plurality of members, one of which is adapted to press the said roller elements against their roller races by the centrifugal effect of its mass to prevent said roller elements from sliding in said raceway, and devices acting on said pressure member and adapted to increase the pressing force exerted thereby against the said roller elements, substantially as described.

2. In a roller bearing, the combination of a raceway, roller elements movable therein, said raceway comprising a plurality of members, one of which is adapted to press, by the centrifugal effect of its mass, the said roller elements against the roller race in a manner to prevent said roller elements from sliding in said roller race, and a device adapted to increase the pressing force, said device acting on the pressure member, by virtue of the centrifugal force inherent in said device, to increase the pressing force of said pressure member against said roller elements, substantially as described.

3. In a roller bearing, the combination of a raceway, roller elements movable therein, devices adapted to increase the pressing force, a movable ring arranged inside of the bearings and adapted, by virtue of the centrifugal force inherent in said ring, to press said roller elements against the roller race in a manner to prevent said roller elements from sliding in the said raceway, said ring being provided with a tapering slit, a tapering key movable in said slit, a weight arranged within the said ring and connected with said key for pressing the roller elements against their roller race, said weight acting on said key by virtue of the centrifugal force of the weight, to spread said ring against said roller elements, substantially as described.

4. In a roller bearing, the combination of a raceway, roller elements movable therein, a slotted ring arranged to press said roller elements against the raceway, a tapering key engaging in the slot of said ring, a weight of pendulum type arranged within said ring, and a pin arranged to transmit the action of said weight to the ring to cause the latter to press the roller elements against the raceway, substantially as described.

5. In a roller bearing, the combination of a raceway, roller elements movable therein, a slotted ring for pressing the roller elements against said raceway, a weight of pendulum type arranged within the said ring, a tension rod connected with said weight and a tapering key at one end of said rod adapted to engage in the slit of the ring to expand the same and thereby press the roller elements against the raceway, substantially as described.

6. In a roller bearing, the combination of a raceway, roller elements movable therein, the inner race of said raceway including a movable member, a pendulum, a rod cooperating with said pendulum to cause said movable member to press against said roller elements to press the latter against the raceway, substantially as described.

7. In a roller bearing, the combination of a raceway, roller elements movable therein, the inner race of said raceway including a section movable by the action of centrifugal force to press said roller elements against the raceway, a pendulum, and means whereby the action of said pendulum is transmitted to said movable section, substantially as described.

In testimony whereof we affix our signatures.

ALBERT HEESS.
OTTO SCHILLING.